(12) United States Patent
Shoup

(10) Patent No.: US 7,523,523 B2
(45) Date of Patent: Apr. 28, 2009

(54) WINDSHIELD WIPER WITH SCRAPER

(75) Inventor: Jesse John Shoup, Ypsilanti, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 0 days.

(21) Appl. No.: 11/758,805

(22) Filed: Jun. 6, 2007

(65) Prior Publication Data

US 2008/0301897 A1    Dec. 11, 2008

(51) Int. Cl.
*B60S 1/38* (2006.01)

(52) U.S. Cl. .............. 15/250.4; 15/250.41; 15/245; 15/250.48

(58) Field of Classification Search .......... 15/250.41, 15/250.4, 250.48, 250.361, 245; D12/219, D12/220

See application file for complete search history.

(56) References Cited

U.S. PATENT DOCUMENTS

| | | | |
|---|---|---|---|
| 1,816,370 A | | 7/1931 | Hachenberg |
| 1,953,703 A | | 4/1934 | Dirienzo |
| 2,107,567 A | * | 2/1938 | Grece ................ 15/250.4 |
| 2,253,249 A | * | 8/1941 | Peterson ............ 15/250.4 |
| 2,255,393 A | * | 9/1941 | Osborn ............. 15/250.07 |
| 2,284,976 A | * | 6/1942 | Horton et al. ....... 15/250.4 |
| 2,797,428 A | * | 7/1957 | Wallis ............. 15/250.452 |
| 3,116,510 A | | 1/1964 | Oishei |
| 3,238,555 A | * | 3/1966 | Cels ................ 15/250.04 |
| 3,638,274 A | | 2/1972 | Farver |
| 3,766,591 A | * | 10/1973 | Soito ................. 15/245 |
| 4,317,251 A | | 3/1982 | Priesemuth et al. |
| 4,473,919 A | * | 10/1984 | Fritz, Jr. ............. 15/250.4 |
| 4,567,621 A | | 2/1986 | Alley, Jr. |
| 4,649,593 A | | 3/1987 | Gilliam, III et al. |
| 5,168,595 A | | 12/1992 | Naylor, Jr. |
| 5,235,720 A | | 8/1993 | Kinder |
| 5,327,615 A | | 7/1994 | Green |
| 5,423,105 A | * | 6/1995 | Scott ................ 15/250.4 |
| 5,459,900 A | * | 10/1995 | Mege et al. ......... 15/250.48 |
| 5,568,670 A | * | 10/1996 | Samples et al. ..... 15/250.48 |
| 5,996,168 A | | 12/1999 | Watkins |
| 6,622,337 B2 | * | 9/2003 | Hsieh ............... 15/250.03 |
| 2002/0032945 A1 | | 3/2002 | Miyamoto |
| 2006/0059649 A1 | | 3/2006 | Meredith et al. |

FOREIGN PATENT DOCUMENTS

| | | | |
|---|---|---|---|
| EP | 0100622 | | 2/1984 |
| EP | 0744326 | | 11/1996 |
| FR | 2695607 | * | 3/1994 |
| JP | 04321459 | | 11/1992 |
| WO | WO-8400523 | | 2/1984 |

\* cited by examiner

*Primary Examiner*—Gary K Graham
(74) *Attorney, Agent, or Firm*—Gifford, Krass, Sprinkle, Anderson & Citkowski, P.C.

(57) ABSTRACT

A windshield wiper for an automotive vehicle having an elongated base and an elongated flexible blade extending outwardly in a first direction from the base. The blade has a free edge adapted to contact a windshield on an automotive vehicle. An elongated scraper also extends outwardly from the base at an acute angle relative to the blade so that a free edge of the scraper is spaced from and generally parallel to the free edge of the blade. The scraper is constructed of a material more rigid than the blade to remove adhered debris from the windshield upon transverse movement of the windshield wiper.

1 Claim, 2 Drawing Sheets

WINDSHIELD WIPER WITH SCRAPER

BACKGROUND OF THE INVENTION

I. Field of the Invention

The present invention relates generally to a windshield wiper for use with an automotive vehicle.

II. Description of Related Art

Almost all automotive vehicles include one or more windshield wipers which are designed to clean the automotive windshield and provide a clear vision for the driver and other occupants of the vehicle. The previously known windshield wipers typically comprise an elongated base which is attached to a holder assembly while an elongated flexible blade extends outwardly from the base and is adapted to contact the windshield in operation. The blade and base are typically of a one-piece construction.

While these previously known windshield wipers adequately clear the vehicle windshield of water due to the squeegee action of the blade during transverse movement of the wiper, these previously known windshield wipers have not proven adequate in removing debris, such as insects, from the windshield. Instead, because the blade is constructed of a soft elastomeric material, these previously known windshield wipers merely pass over, but do not remove, the debris from the windshield.

SUMMARY OF THE PRESENT INVENTION

The present invention provides a windshield wiper assembly which provides improved cleaning of the automotive windshield by removing not only water, but also debris, such as insects, that are adhered to the windshield surface.

In brief, the windshield wiper of the present invention comprises an elongated base which is adapted to be mounted in a holder assembly for the windshield wiper. An elongated flexible blade extends outwardly from the base which is adapted to contact the windshield during transverse movement of the windshield wiper across the windshield. The blade, furthermore, is made of a soft elastomeric material and produces a squeegee action on the windshield as the windshield wiper is moved transversely across the windshield.

In order to remove adhered debris from the windshield, an elongated scraper extends outwardly from the base at an acute angle relative to the blade so that a free edge of the scraper is spaced from and generally parallel to a free edge of the blade. The scraper, furthermore, is constructed of a material more rigid than the blade and is sufficiently rigid so that, upon transverse movement of the windshield wiper in a first direction, the blade not only contacts the windshield, but also removes adhered debris, such as insects, from the windshield.

The base, blade and scraper are all integrally formed together. Furthermore, since the base is constructed of a flexible material, the scraper preferably contacts the windshield only as the windshield wiper is moved in a first transverse direction across the windshield. Conversely, as the windshield is moved in the opposite transverse direction, the flexibility of the base allows the scraper to pivot away from the windshield so that only the blade contacts the windshield upon movement in the opposite transverse direction. This, in turn, enhances the overall cleaning action of the windshield wiper.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which.

DETAILED DESCRIPTION OF A PREFERRED EMBODIMENT OF THE PRESENT INVENTION

Figure 1:
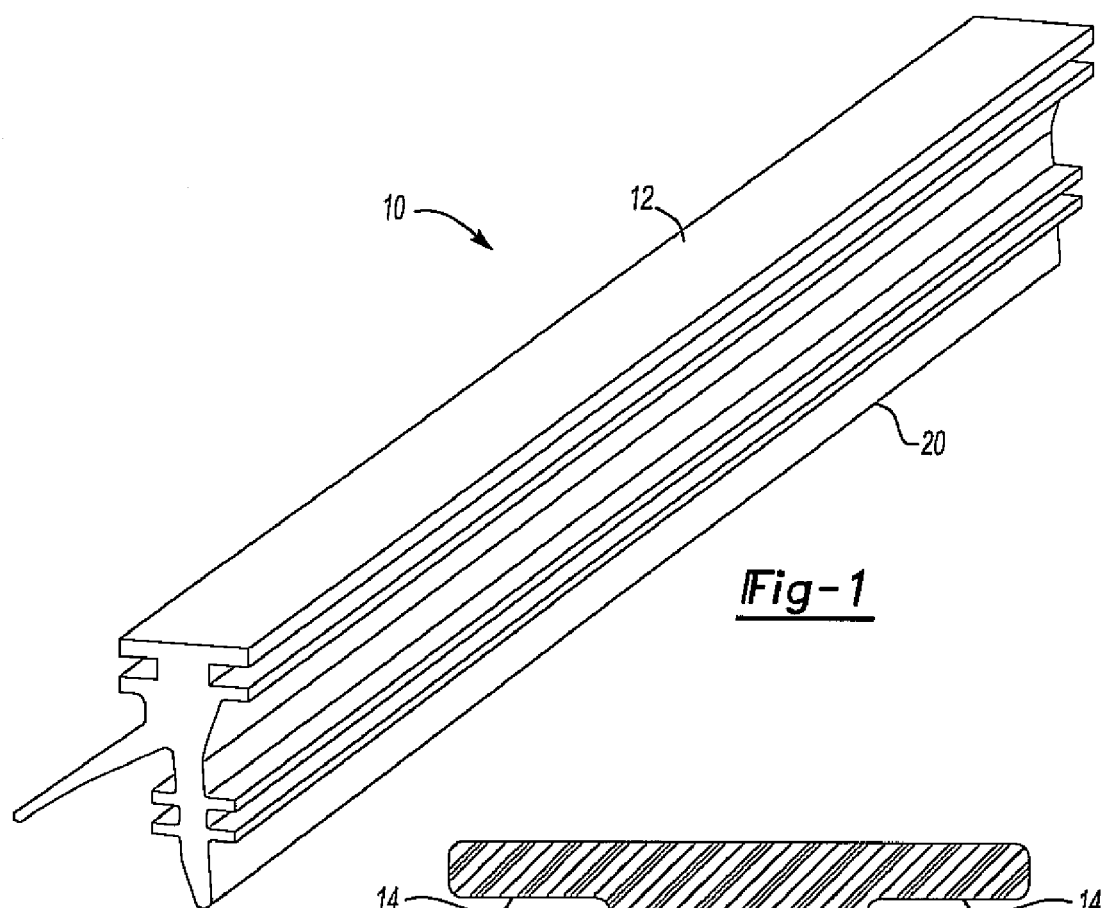
FIG. 1 is an elevational view illustrating an embodiment of the windshield wiper.
Figure 2:
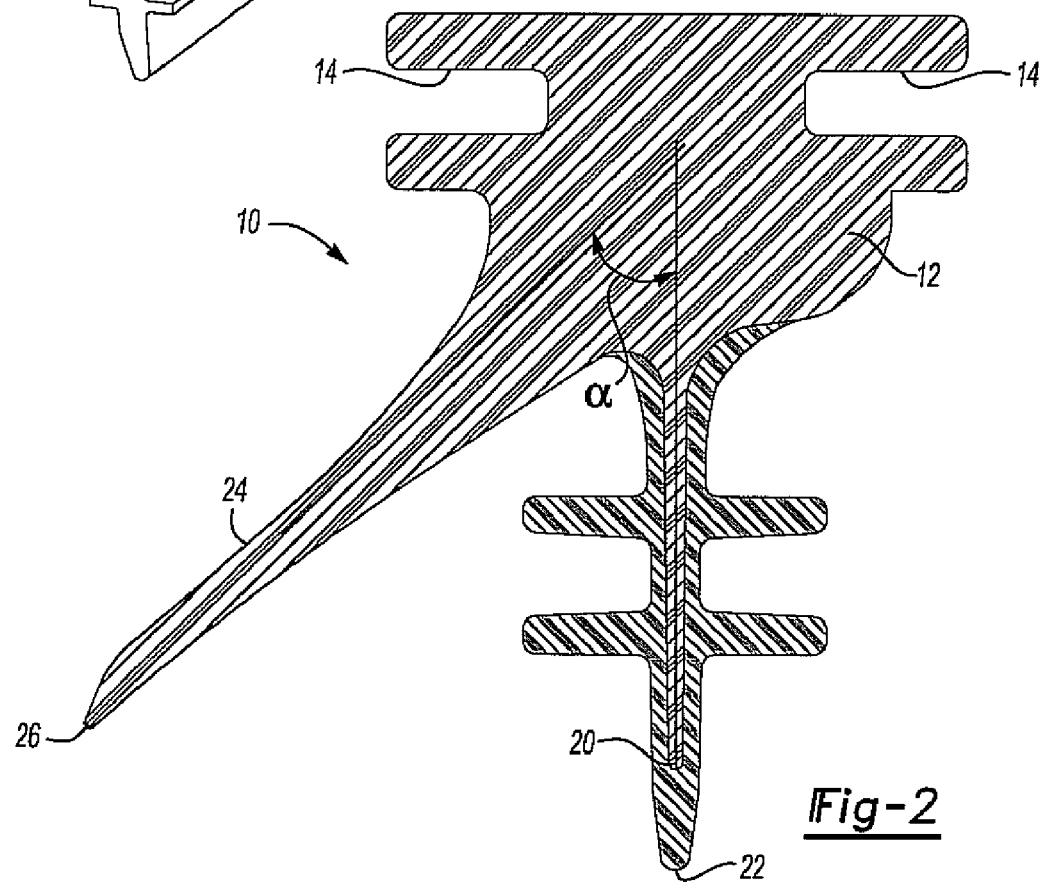
FIG. 2 is an end view illustrating the windshield wiper.
Figure 3:
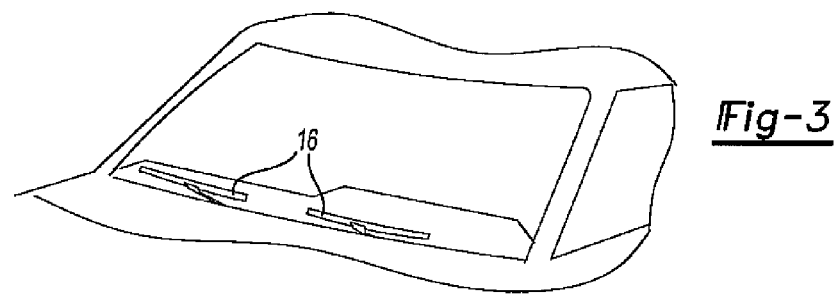
FIG. 3 is an elevational view illustrating the windshield wiper mounted in a holder assembly.

With reference first to FIGS. 1-3, an embodiment of a windshield wiper 10 is shown and includes an elongated base 12. The base 12 is made of a flexible, elastomeric material and includes appropriate slots 14 for mounting the wiper 10 in a holder assembly 16 (FIG. 3). In the conventional fashion, the holder assembly 16, together with the attached wiper 10, is moved transversely in an arc across the windshield surface to be cleaned.

An elongated flexible blade 20 extends outwardly from the base 12 in a first direction away from the holder assembly 16. This wiper blade 20 is preferably made of a soft elastomeric material, such as soft rubber. A free edge 22 of the blade 20 is adapted to contact the windshield in operation to provide a squeegee action to remove water from the windshield. Furthermore, the base 12 and blade 20 are preferably of a one-piece integral construction.

Still referring to FIGS. 1 and 2, an elongated and generally planar scraper 24 is integrally attached to the base 12 and extends outwardly from the base 12 at an acute angle α (FIG. 2) relative to the direction of the wiper 20. The scraper 24, furthermore, includes a free edge 26 and is constructed of a material more rigid than the wiper 20 and sufficiently rigid to remove adhered debris from the windshield.

Any conventional means may be used to increase the rigidity of the scraper 24 relative to the wiper 20. For example, a different durometer of material may be used for the scraper 24 than the wiper 20. Alternatively, the scraper 24 may include a rigid insert, such as a metal insert, to increase the rigidity of the scraper 24.

Figure 4:
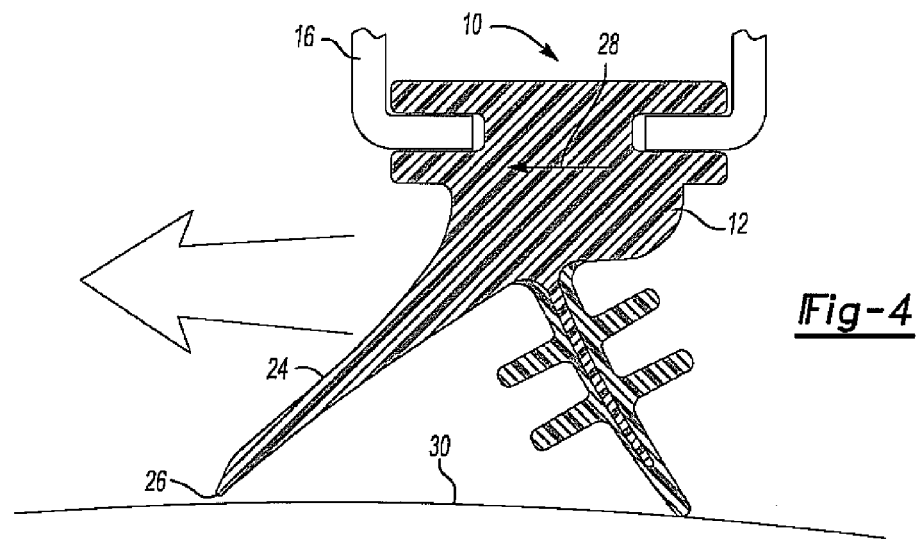
FIG. 4 is an end view illustrating the operation of the windshield wiper upon movement in a first transverse direction.

With reference now to FIG. 4, as the holder assembly 16 moves the windshield wiper 10 in a first transverse direction 28 towards the scraper 24, the scraper 24 pivots downwardly due to the flexibility of the base 12 so that the free edge 26 of the scraper 24 contacts a windshield 30 to be cleaned. Furthermore, during movement of the wiper 10 in the direction 28, the scraper 24 is of sufficient rigidity to remove adhered debris, such as dead insects, from the windshield 30.

Figure 5:
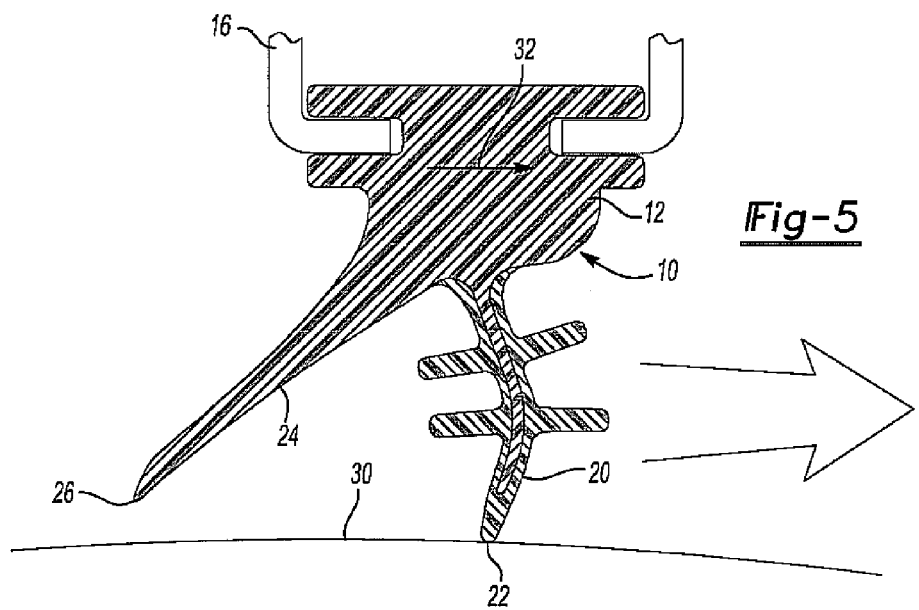
FIG. 5 is a view similar to FIG. 4, but illustrating the operation of the wiper during transverse movement of the wiper in the opposite direction.

With reference now to FIG. 5, upon movement of the windshield wiper 10 in the opposite transverse direction 32, the flexibility of the base 12 allows the scraper 24 to pivot away from the windshield 30 while the free end 22 of the blade 20 maintains contact with the windshield 30 to wipe the windshield 30 clean due to the squeegee action of the blade 20. Furthermore, since the free edge 26 of the scraper 24 is spaced from the windshield 30 during movement of the wiper 10 in the direction 32, any smearing of the windshield 30 that might otherwise be caused by the scraper 24 is avoided.

From the foregoing it can be seen that the present invention provides a simple yet effective windshield wiper construction which not only removes water and other liquids from the windshield surface, but also removes adhered particles from the windshield surface 30. Having described my invention, however, many modifications thereto will become apparent to those skilled in the art to which it pertains without deviation from the spirit of the invention as defined by the scope of the appended claims.

I claim:

1. A windshield wiper mounted in a holder assembly for transverse movement over a windshield, said wiper comprising:
   an elongated base, said base having slots on opposite sides thereof,
   an elongated flexible blade constructed of an elastomeric material extending outwardly in a first direction from said base, said blade having a free edge, said blade having a pair of spaced longitudinal projections extending laterally from each side thereof,
   a single elongated scraper extending outwardly from only one side of said base at an acute angle relative to said first direction so that a free edge of said scraper is spaced from and generally parallel to said blade free edge, said scraper being constructed of a continuous material with said base and having a different durometer than said blade so that said scraper is more rigid than said blade,
   wherein said base is constructed of a flexible material so that said scraper pivots between a windshield contacting position upon transverse movement of the wiper in one direction, and a position spaced apart from the windshield upon movement of the wiper in a transverse direction opposite from said one direction,
   wherein said base, said blade and said scraper are of a one piece integral construction, and
   wherein said continuous material of said scraper and base extends down through a center of said blade, past said spaced projections, to an end positioned within the blade and adjacent said free edge of said blade.

* * * * *